United States Patent Office 2,865,921
Patented Dec. 23, 1958

2,865,921

CYCLIC AMINOALKYL CHLOROCARBANILATES

Kurt J. Rorig, Evanston, Ill., assignor to G. D. Searle & Co., Chicago, Ill., a corporation of Delaware No Drawing. Application January 17, 1956
Serial No. 559,518

7 Claims. (Cl. 260—294.3)

This invention relates to aminoalkyl esters of halogenated carbanilic acids, the salts of such esters, and processes for the manufacture of these esters and their salts. More particularly, this invention relates to compounds of the formula $$Ar-NHCOO-Alk-Z$$

wherein Ar is a phenyl radical substituted by at least 1 chlorine atom, Alk is a lower alkylene radical, and Z is an alkylated amino radical.

In the foregoing structural formula, the chlorinated phenyl radicals comprehended by Ar include o-, m-, and p-chlorophenyl radicals, as also polychlorophenyl radicals such as 2,4-dichlorophenyl, 2,5-dichlorophenyl, 2,4,6-trichlorophenyl, etc. The lower alkylene radicals herein represented by Alk are bivalent, saturated, acyclic, straight- or branched-chain hydrocarbon radicals of empirical formula $$C_nH_{2n}$$

wherein $n$ is a positive integer greater than 1, and which are exemplified by:

1,2-ethylene (—CH$_2$CH$_2$—)
Trimethylene (—CH$_2$CH$_2$CH$_2$—)
1,2-propylene (—CH$_2$CHCH$_3$)

Tetramethylene (—CH$_2$CH$_2$CH$_2$CH$_2$—)
2-methyl-1,2-propylene (—CH$_2$CCH$_3$)
  |
  CH$_3$ 2,4-pentylene (CH$_3$CHCH$_2$CHCH$_3$)

2,2-dimethyl-1,3-propylene

CH$_3$
   |
(—CH$_2$CCH$_2$—)
   |
   CH$_3$ 3-methyl-1,4-butylene (—CH$_2$CH$_2$CHCH$_2$—)
          |
          CH$_3$ Hexamethylene (—CH$_2$CH$_2$CH$_2$CH$_2$CH$_2$CH$_2$—)

and like radicals. As to Z in the generic formula for compounds of this invention, it denotes a 5- or 6-membered heterocycle composed of methylene (—CH$_2$—) radicals and the single nitrogen atom shown, said heterocycle being substituted by 1 or 2 alkyl groups aggregating not more than 3 carbon atoms. Illustrative of the cyclic amino radicals thus specified are 2-methylpyrrolidinyl, 2,5-dimethylpyrrolidinyl, 3 - methyl - 4 - ethylpyrrolidinyl, 3-methylpiperidino, and 2,6-dimethylpiperidino radicals.

Equivalent to the basic amino esters of this invention for the purposes here described are non-toxic acid addition and quaternary ammonium salts thereof, the composition of which may be symbolized by $$Ar-NHCOO-Alk-Z \cdot RX$$

wherein Ar, Alk, and Z have the meanings hereinbefore assigned; R is hydrogen or a lower alkyl radical; and X is 1 equivalent of an anion—for example, chloride, bromide, iodide, methyl sulfate, ethyl sulfate, benzenesulfonate, toluenesulfonate, tartrate, succinate, malate, acetate, citrate, nitrate, sulfate, phosphate, sulfamate, or the like—which, in combination with the cationic portion of a salt aforesaid, is neither pharmacologically nor otherwise undesirable in pharmaceutical dosage.

The compounds to which this invention relates are useful because of their distinctive pharmacological properties. For example, the subject compounds are valuable cardioregulatory agents. They produce a reversion of both atrial and ventricular fibrillation or flutter in experimental animals, which commends their application in a variety of cardiac dysfunctions associated with rhythm changes of the heart caused by disturbances in the regular automaticity or conductance pattern of its beat.

The amine bases which comprise this invention are relatively insoluble in water, but may be dissolved in dilute acids and in such of the common organic solvents as alcohol, ethyl acetate, ether, and benzene. The acid addition and quaternary ammonium salts of this invention are, on the other hand, soluble in water and in aqueous solutions of alcohol or other water-miscible organic solvents. The subject compounds may be administered in solid form as tablets or capsules; dissolved or suspended in aqueous media, they may be given parenterally.

The compounds of the present discovery may be manufactured as follows: An appropriate chlorophenyl isocyanate, Ar—NCO, is contacted with a suitable amino alcohol, Z—Alk—OH, to produce a claimed tertiary base, Ar—NHCOO—Alk—Z, the terms Ar, Alk, and Z being defined as before. Contact is maintained at temperatures ranging from 15° to 125° centigrade for periods of time ranging from a few minutes to as long as several hours, lower temperatures generally being preferable as reaction time is increased, and vice versa. One efficacious combination of temperature and time is 6 hours at 35° centigrade. The subject process may be carried out in solvent medium if desired, and while such is not essential, it appears to inhibit the formation of extraneous by-products in some instances. Satisfactory solvents include ether, chloroform, carbon tetrachloride, n-heptane, and like inert, non-polar, organic liquids.

Conversion of the amine bases of this invention to the corresponding acid addition salts is accomplished by simple admixture of these compounds with 1 equivalent of any of various inorganic and strong organic acids, the anionic portion of which conforms to X as hereinabove defined. Alternatively, the bases in question may be quaternized by contact with an alkyl ester of the formula $$R-X$$

R and X having the meanings hereinbefore assigned. Quaternization takes place in the temperature range between 25° and 100° centigrade, using an inert solvent such as chloroform, acetone, butanone, methanol, butanol, or the like as reaction medium. Quaternization is ordinarily completed in from 6 to 60 hours and is generally carried out in a closed system if a lower alkyl halide—such as methyl chloride—is one of the reagents. Using methyl bromide, the manufacture of quaternary salt may be smoothly effected in butanone solution at 70° centigrade, the reaction time being approximately 12 hours.

The following examples describe in detail certain of the compounds illustrative of the present invention and methods which have been devised for their manufacture. However, the invention is not to be construed as limited thereby, either in spirit or in scope, since it will be apparent to those skilled in the art of organic synthesis that many modifications, both of materials and of methods, may be practiced without departing from the purpose and intent of this disclosure. In the examples hereinafter detailed, temperatures are given in degrees centigrade (° C.) and relative amounts of materials in parts by weight, except as otherwise noted.

*Example 1*

2-(2,6-dimethylpiperidino)ethyl p-chlorocarbanilate hydrochloride.—A solution of of 15 parts of 2-(2,6-dimethylpiperidino)ethanol and 17 parts of p-chlorophenyl isocyanate in 355 parts of anhydrous ether is heated at reflux temperatures for 5 hours. A small amount of insoluble matter appears after approximately 1½ hours. Following the heating period, the insoluble matter is filtered out and the filtrate then precipitated with an excess of gaseous hydrogen chloride. The solid product which comes down is isolated on a filter and finally recrystallized from a 1:6 mixture of absolute alcohol and anhydrous ether. The 2-(2,6-dimethylpiperidino)-ethyl p-chlorocarbanilate hydrochloride thus obtained melts at 175–177° C. and has the formula

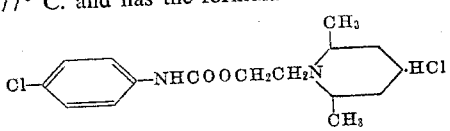

*Example 2*

2-(2,6-dimethylpiperidino)ethyl m-chlorocarbanilate hydrochloride.—A mixture of 15 parts of 2-(2-6-dimethylpiperidino)ethanol, 16 parts of m-chlorophenyl isocyanate, and 355 parts of anhydrous ether is refluxed at the boiling point for approximately 6 hours, 8 parts of absolute ethanol being introduced about 10 minutes before the end of the heating period to destroy excess isocyanate. At the end of the prescribed heating period, slightly more than the theoretical equivalent of ethanolic hydrogen chloride is added, precipitating the desired 2-(2,6-dimethylpiperidino)ethyl m-chlorocarbanilate hydrochloride as white crystals which, taken up in boiling absolute alcohol and precipitated with anhydrous ether, melt at 208–210° C. (with decomposition). The product has the formula

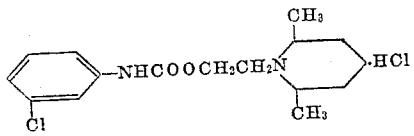

*Example 3*

2-(2,5-dimethyl-1-pyrrolidinyl)ethyl o-chlorocarbanilate hydrochloride.—To 355 parts of anhydrous ether is added 28 parts of 2-(2,5-dimethyl-1-pyrrolidinyl)-ethanol and 31 parts of o-chlorophenyl isocyanate. This mixture is heated for 6 hours at the boiling point, approximately 8 parts of absolute ethanol being combined therewith during the final ten minutes of the heating period. The reaction mixture is divided into equal fractions, I and II.

Fraction I is precipitated with an excess of ethanolic hydrogen chloride. The solid product thrown down is separated by filtration, and purified by recrystallization from a mixture of absolute ethanol and anhydrous ether. The product which results is 2-(2,5-dimethyl-1-pyrrolidinyl)ethyl o-chlorocarbanilate hydrochloride, melting at approximately 163–164° C. This salt has the formula

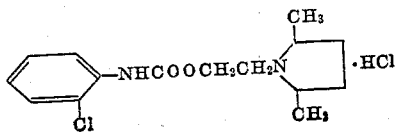

*Example 4*

2-(2,5-dimethyl-1-pyrrolidinyl)ethyl o-chlorocarbanilate methiodide.—Fraction II as obtained by the procedure detailed in the foregoing Example 3 is heated in an inert atmosphere at approximately 90° C. to remove solvent. The oily residue is dissolved in 150 parts of chloroform, to which is then added approximately 57 parts of methyl iodide. This mixture is heated in a closed system at 70° C. overnight, following which solvent is evaporated as before. The residue crystallizes on standing to a yellow solid which, recrystallized from absolute ethanol, and then from a mixture of chloroform and butanone, melts at 165–167° C. The quaternary salt thus obtained is 2-(2,5-dimethyl-1-pyrrolidinyl)ethyl o-chlorocarbanilate methiodide.

*Example 5*

2-(2,5-dimethyl-1-pyrrolidinyl)ethyl m-chlorocarbanilate hydrochloride.—A mixture of 28 parts of 2-(2,5-dimethyl-1-pyrrolidinyl)ethanol, 31 parts of m-chlorophenyl isocyanate, and 355 parts of anhydrous ether is heated at reflux temperatures for 6 hours, a small amount of absolute ethanol being added at the close of the reaction period to destroy excess isocyanate. The product which results is divided into equal fractions, I and II.

Fraction I is precipitated with an excess of ethanolic hydrogen chloride. The oil which comes down solidifies on standing and, twice recrystallized from a mixture of absolute alcohol and anhydrous ether, shows a melting point of 179–181° C. The 2-(2,5-dimethyl-1-pyrrolidinyl)ethyl m-chlorocarbanilate hydrochloride obtained thus as white crystals has the formula

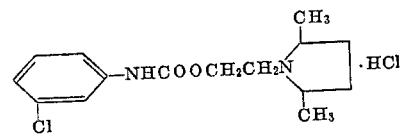

*Example 6*

2-(2,5-dimethyl-1-pyrrolidinyl)ethyl m-chlorocarbanilate methiodide.—Fraction II prepared by the procedure of the foregoing Example 5 is freed of solvent by evaporation in an inert atmosphere at approximately 90° C. The semi-solid residue is crystallized from n-heptane, yielding pure 2-(2,5-dimethyl-1-pyrrolidinyl)ethyl m-chlorocarbanilate melting in the range 88–96° C. To 9 parts of the free base thus obtained dissolved in 80 parts of butanone is added 23 parts of methyl iodide. The resultant mixture is heated in a closed system at 70° C. for approximately 60 hours. Solvent is then removed by evaporation at 90° C., leaving an orange residue which, crystallized from approximately 7 volumes of absolute ethanol, melts at 156–158° C. with previous softening. The product is 2-(2,5-dimethyl-1-pyrrolidinyl)ethyl m-chlorocarbanilate methiodide.

What is claimed is:
1. A compound of the formula

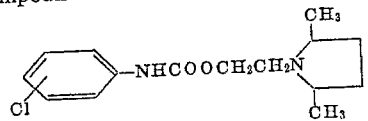

2. 2-(2,5-dimethyl-1-pyrrolidinyl)ethyl m-chlorocarbanilate.
3. 2-(2,5-dimethyl-1-pyrrolidinyl)ethyl o-chlorocarbanilate hydrochloride.
4. A compound of the formula Ar—NHCOO—Alk—Z wherein Ar is a chlorophenyl radical, Alk is an ethylene radical, and Z is selected from the group consisting of dimethylpyrrolidino and dimethylpiperidino radicals.

5. A compond of the formula
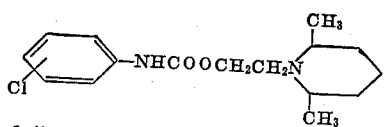
6. 2-(2,6-dimethylpiperidino)ethyl p-chlorocarbanilate.
7. 2-(2,6 - dimethylpiperidino)ethyl m-chlorocarbanilate.
References Cited in the file of this patent
UNITED STATES PATENTS
| | | |
|---|---|---|
| 2,409,001 | Shelton et al. | Oct. 6, 1946 |
| 2,449,440 | Aeschlimann | Sept. 14, 1948 |
| 2,700,039 | Ehrhart et al. | Jan. 18, 1955 |
OTHER REFERENCES
Cook et al.: JACS, vol. 58, pages 1079–81 (1936).